Figure 1:
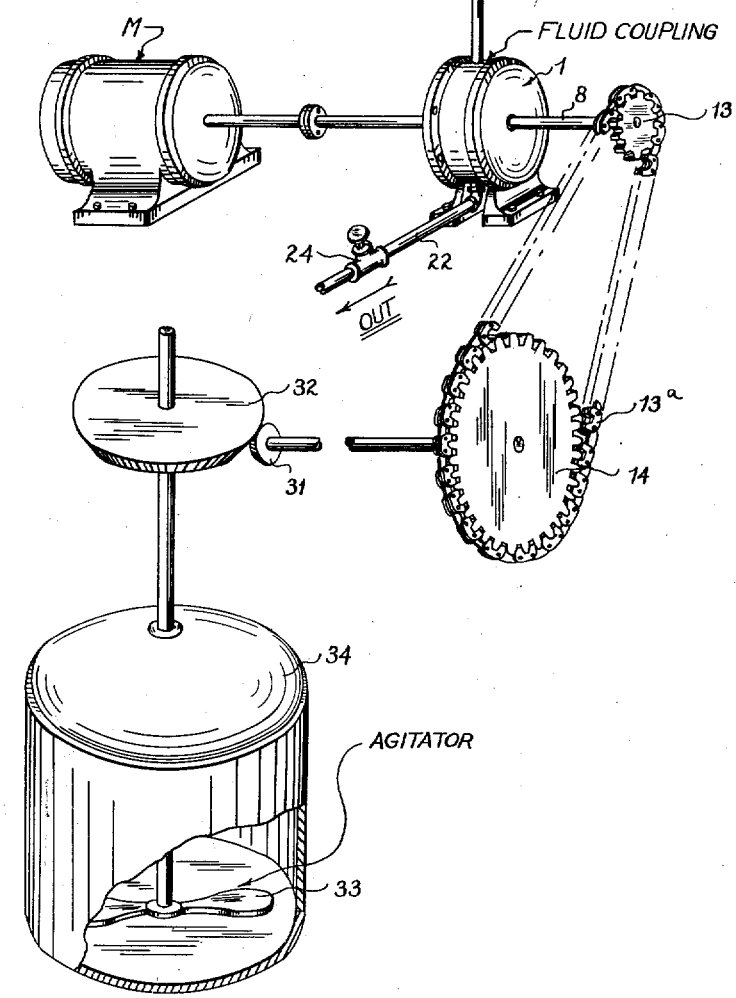

Patented June 24, 1952

2,601,548

UNITED STATES PATENT OFFICE 2,601,548

VARIABLE SPEED ROTARY HYDRAULIC COUPLING

Paul S. Monroe, Elyria, Ohio, assignor to The Pfaulder Co., Rochester, N. Y., a corporation of New York Application December 2, 1946, Serial No. 713,403

3 Claims. (Cl. 60—54)

This invention relates generally to fluid couplings and particularly to a novel fluid coupling comprising a fixed housing, rotors rotatable therein and means for passing liquid into and out of the housing to vary output rotor speeds. This invention also relates to a novel combination of a fluid coupling connected to drive an agitator.

Fluid couplings developed prior to my invention have included a fluid housing fixed to one of the rotors and enclosing the other rotor. That construction presents difficult mechanical problems in installations where it is desirable to control the flow of fluid into or out of the device. To overcome these difficulties I have invented a novel fluid coupling wherein both rotors rotate within and independently of a fixed fluid retaining housing. With this construction I may introduce fluid into and drain it from the fixed housing of the coupling while in operation, without employment of troublesome fluid connections between moving parts. In addition to providing a more simple and economical construction, my novel coupling structure has other unexpected and important advantages. In a coupling made in accordance with my invention, fluid may be introduced into the coupling adjacent the periphery of the housing and the inlet pressure is measured with the coupling in operation, and so long as the coupling it not completely filled and the input driven at a constant speed the measurement of inlet pressure may be employed to indicate output rotor speed which results in a simple system of control heretofore not afforded by the art.

A further object resides in the employment of a fluid coupling of novel design to drive a fluid agitator in connection with the provision of means whereby the pressure within the housing of the coupling is a function of agitator speed, there being means for regulating said pressure and hence for regulating agitator speed.

These and other objects will be apparent to those skilled in the art as the following detailed description of a preferred embodiment of my invention proceeds.

Figure 2:
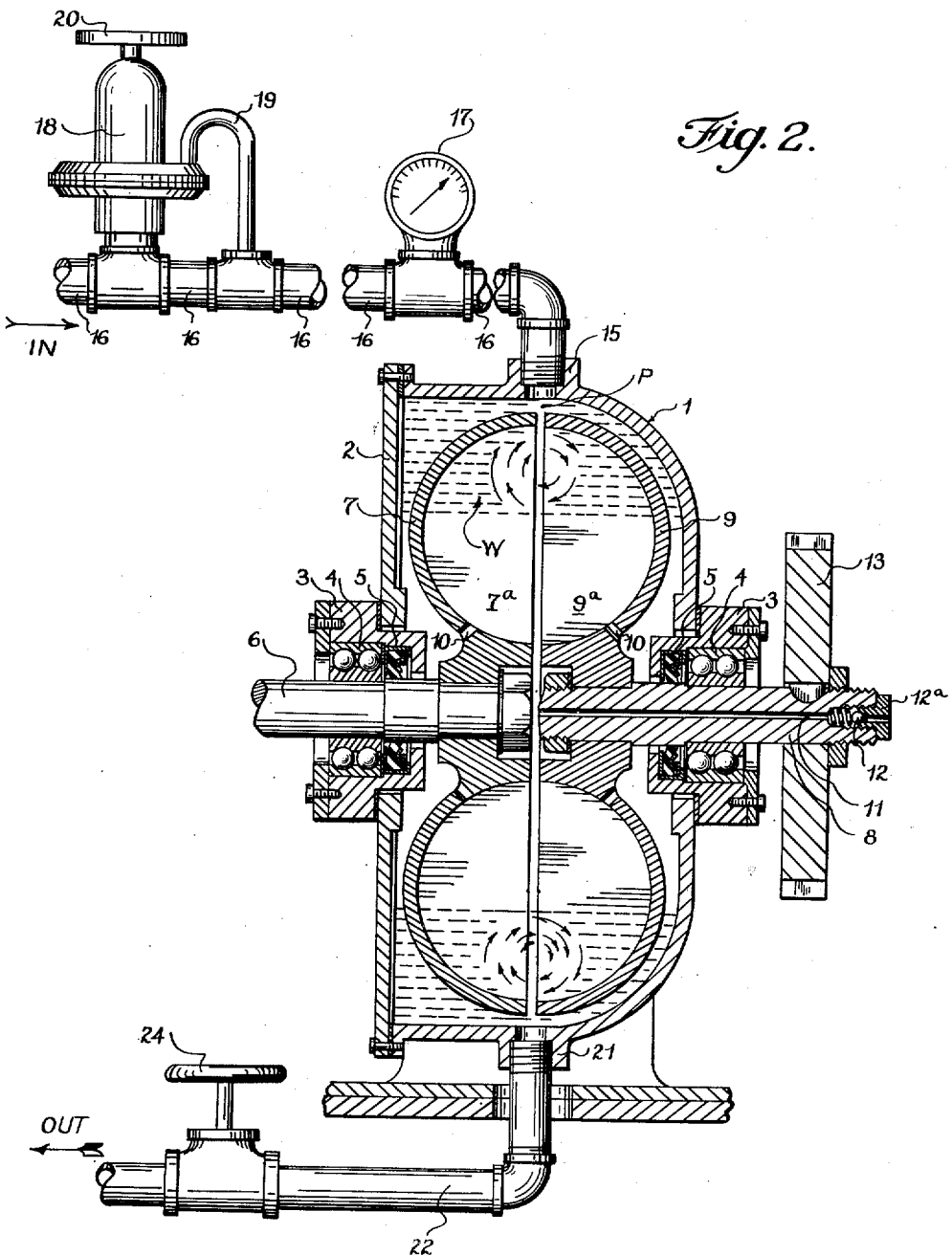

In the drawings:

Fig. 1 is a schematic diagram of the elements in my novel combination of fluid coupling and agitator; and Fig. 2 is a sectional view through my fluid coupling.

Referring to the schematic diagram in Fig. 1, it can be seen that I provide a motor or other prime mover M to drive the input rotor of a fluid coupling. The output shaft 8 of the coupling may carry pinion 13 which drives gear 14 by means of chain 13a. Gear 14 may drive bevel gear 31 meshed with a larger bevel gear 32 that turns the agitator element 33 in container 34. I prefer to have a gear reduction in the drive, as shown. I may employ silent chains, sprockets, gear trains or any other machine elements to drivingly connect the coupling with the agitator, and these may be made removable to change the reduction.

In order to control the volume of water in the housing and between the rotors of the agitator, I provide a source of water or other fluid in pipe 16 which is constantly being forced into the housing at one point and which drains out at another point. Then, by regulating the pressure within the housing, I can control the amount of fluid in the working chambers of the rotors and so long as input speed is substantially constant, this regulates the speed of the output rotor within limits. The circulation of water or other fluid through the coupling has another function in that it dissipates heat engendered by a slipping between the rotors and prevents overheating and boiling of the control fluid.

As seen in Fig. 2, the fluid coupling has a fixed housing 1 to which is fastened a closure plate 2. A pair of bearing retainers 3 are mounted to opposite sides of the housing, each retainer preferably mounting a suitable anti-friction bearing as at 4. The bearing retainers may be provided with sealing members 5 to assist in retaining the fluid within the housing and to prevent the introduction of foreign matter into the unit. An input shaft 6 driven by the prime mover is mechanically connected to the input rotor 7 by any convenient means. The rotor 7 is provided with a plurality of circumferentially spaced circulating blades 7a, in accordance with conventional fluid coupling practice. The output shaft 8 is fastened to the output rotor 9, which rotor has a plurality of blades 9a for cooperation with those of the other rotor.

In order to provide for the bleeding of air as the liquid level in the coupling is changed, I provide one or more bleed apertures 10 for each rotor. Of course, as the amount of liquid circulating in the coupling is reduced, air must be drawn in. I contemplate that the sealing members 5 might be arranged to permit air to enter the coupling. However, to insure that a vacuum will not be created, I may provide a passageway 11 in one of the shafts. The inner end of the passageway is open to the working chamber within the coupling and closed at its outer end by a spring loaded check valve 12 engaging a seat in a plug member 12a. With this arrangement the fluid cannot escape from the coupling. However, if the quantity of fluid within the coupling is reduced during its operation, atmospheric pressure can force valve 12 off its seat and permit air to make up for the decrease in volume of fluid in the coupling.

As mentioned previously, I provide a constantly circulating stream of water or other fluid for the coupling. There is an inlet nipple 15, preferably positioned adjacent the periphery of the rotors which, by means of suitable inlet piping 16, connects to a pressure gauge 17 and to a regulator 18. The regulator 18 may be of the automatic adjustable type which has inlet and outlet chambers. Pressure of the outlet is sensed by conduit means 19, which transmit that pressure to the one side of a valve control diaphragm within the regulator to cause the outlet pressure to remain at the selected value. Since I contemplate that any conventional pressure regulator may be used, I have not illustrated the details of regulator construction, these devices being well-known to all mechanics skilled in the art. I prefer to employ a regulator with an adjusting means indicated at 20 in order to provide a range of pressures available for selection during the operation of the unit.

An outlet nipple 21 is positioned adjacent the periphery of the rotors and may be diametrically opposite the inlet nipple. Nipple 21 is connected to line 22 so that fluid is exhausted through a metering valve 24 to the outlet.

I provide a motor of such a power and speed which, taking into consideration the gear reduction by the mechanical elements 13 and 14, is sufficient to drive the agitator at the highest desired speed. I then provide a fluid coupling of such a size that when the coupling is approximately full of fluid, the horsepower that will be transmitted by the coupling is approximately equal to that developed by the motor, which is made sufficient to drive the agitator at its highest desired speed. As the coupling is driven, fluid within the working chamber W formed by the cooperation of the rotors circulates as indicated by the arrows in Fig. 2. For example, if the quantity of fluid in the coupling is increased, there follows a greater energy transfer from one rotor to the other, with which the pressure within the rotors increases and the slip between the rotors decreases. If the amount of fluid within the rotors is decreased, rotor slip increases, fluid pressure is decreased, and output rotor speed drops. In either case, fluid pressure is transmitted equally in all directions in accordance with Pascal's law, so that the pressure of the fluid near the control point P equals the pressure in the working chamber W. Also, I have found that the revolving rotors induce a circumferential circulation of the fluid between the rotors and the housing so that the fluid pressure adjacent the periphery of the rotors tends to build up to a value equal to that within the rotors.

To conclude, the above phenomena reveal that when the input rotor is driven at constant speed, the fluid pressure at point P within the housing may be used as a measurement of the output rotor speed. This provides a convenient means for control of output speed without requiring rotating fluid inlet and outlet joints. For example, assuming that the coupling is filled with a certain quantity of fluid, if the source of fluid supply to the coupling be restricted, then less fluid will flow into the coupling and the pressure within the working chamber W cannot be maintained at its previous value. The pressure that had built up due to energy transfer between the rotors will rapidly force fluid out through the exhaust line 22 and the fixed metering valve 24 until the fluid level within the rotors has been reduced to a point where the pressure within the working chamber W due to kinetic energy, again equals the pressure supplied by the fluid source at the inlet P. Under these conditions, due to the reduced volume of fluid within the working chamber W, there is an increased amount of slip between the rotors and the output rotor is driven at a lower speed and its horsepower is less than before. However, since the output rotor speed has dropped, the decreased horsepower output of the coupling is of no consequence when the coupling is driving an agitator. This follows because when agitator speed is decreased, its horsepower requirements fall off in accordance with the same laws that govern the falling off of the horsepower output of the coupling driving the agitator.

In order to facilitate selection of an output speed of the coupling, I take advantage of the phenomenon that when the input rotor is driven at substantially constant speed the pressure at point P may be used as an indication of the output speed of the coupling, by providing a pressure gauge 17 to register such pressure. It is convenient if the pressure gauge 17 is calibrated to read speed directly for a fixed setting of the orifice 24, rather than fluid pressure within the housing. Regardless, in order to select a rotor speed and hence an agitator speed, I need only adjust control means 20 for the pressure regulator until the inlet pressure equals that pressure which corresponds to the desired speed of the output rotor, as indicated on the pressure gauge.

The adjustable metering outlet orifice 24 permits selection of a proper fluid circulation to dissipate the heat engendered by the slip between the rotors. For example, if the orifice is set for too small a circulation, the unit will heat up excessively, whereas if the outlet metering valve is opened too wide, an excessive quantity of circulating fluid will be required in order to maintain the necessary fluid volume within the coupling.

The use of a coupling and driving agitator has an additional advantage in that if the batch for some reason or other becomes inordinately thick, the mechanical gearing is protected and the coupling will slip before the gear teeth or chains in the drive gearing fail.

Of course, those skilled in the art will appreciate that I may provide fixed orifice inlet means and regulate the outlet in accordance with housing pressure to accomplish the results just described.

Investigations have shown that micro-fine or intragranular solids have characteristics like those of liquids and I therefore contemplate that my fluid coupling may be used to drive an agitator containing such solids to obtain results similar to those obtained with fluids. Accordingly, the term "liquid" as applied to an agitator in the claims is to be interpreted as including an agitator containing either liquids or such solids.

Although I have illustrated a preferred embodiment of my invention, those skilled in the art will appreciate that various design details may be varied without departing from the spirit of my invention and I contemplate that the claims and

What is claimed is:

1. In a hydraulic coupling, a fixed liquid housing, driving and driven bladed rotor elements revolving within said housing, said rotor elements being relatively positioned to form a work chamber for the transmission of work liquid from one rotor element to the other, said work chamber being in liquid communication with the chamber formed by said housing near the periphery of said rotor elements, liquid inlet means in said housing located adjacent the periphery of said rotor elements, means to regulate the quantity of liquid within said housing comprising means to admit liquid through said inlet to said housing at a controlled rate and means to continuously bleed liquid from the housing adjacent the periphery thereof at a controlled rate to provide for circulation, and means to measure the pressure of liquid within the housing adjacent the periphery of the latter.

2. In combination, a hydraulic coupling having a fixed liquid housing, driving and driven bladed rotor elements revolving within said housing, a constant speed motor connected to said driving rotor element, said rotor elements being relatively positioned to form a work chamber for the transmission of work liquid from one rotor element to the other, said work chamber being in liquid communication with the chamber formed by said housing near the periphery of said rotor elements, liquid inlet means in said housing located adjacent the periphery of said rotor elements, means to regulate the quantity of liquid within said housing comprising means to admit liquid through said inlet to said housing at a controlled rate and means to continuously bleed liquid from the housing adjacent the periphery thereof at a controlled rate to provide for circulation and means to measure the pressure of liquid within the housing adjacent the periphery of the latter.

3. In combination, a hydraulic coupling having a fixed liquid housing, driving and driven bladed rotor elements revolving within said housing, a constant speed motor connected to said driving rotor element, said rotor elements being relatively positioned to form a work chamber for the transmission of work liquid from one rotor element to the other, said work chamber being in liquid communication with the chamber formed by said housing near the periphery of said rotor elements, liquid inlet means in said housing located adjacent the periphery of said rotor elements, means to regulate the quantity of liquid within said housing comprising means to admit liquid through said inlet to said housing at a controlled rate and means to continuously bleed liquid from the housing adjacent the periphery thereof at a controlled rate to provide for circulation, a gauge connected to measure the pressure of liquid within the housing adjacent the periphery of the latter, said gauge being calibrated to read substantially the speed of the driven rotor element between the limits of the condition when the housing is substantially empty of liquid and when it is substantially full.

PAUL S. MONROE.

REFERENCES CITED

The following references are of record in the file of this patent:

UNITED STATES PATENTS

| Number | Name | Date |
|---|---|---|
| 1,757,827 | Bauer et al. | May 6, 1930 |
| 1,859,607 | Sinclair | May 24, 1932 |
| 1,988,244 | Johnston | Jan. 15, 1935 |
| 2,298,310 | Ray | Oct. 13, 1942 |
| 2,349,329 | Anderson | May 23, 1944 |

FOREIGN PATENTS

| Number | Country | Date |
|---|---|---|
| 511,858 | Great Britain | Aug. 25, 1939 |